(12) United States Patent
Park et al.

(10) Patent No.: US 9,077,896 B2
(45) Date of Patent: Jul. 7, 2015

(54) MOBILE TERMINAL FOR CAPTURING IMAGE AND CONTROLLING METHOD THEREOF

(71) Applicant: LG Electronics Inc., Seoul (KR)

(72) Inventors: Hyekyung Park, Seoul (KR); Joowoo Lee, Seoul (KR); Hyehyun Kim, Seoul (KR); Sunjung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 161 days.

(21) Appl. No.: 13/864,962

(22) Filed: Apr. 17, 2013

(65) Prior Publication Data
US 2013/0329109 A1  Dec. 12, 2013

(30) Foreign Application Priority Data
Jun. 11, 2012  (KR) .................. 10-2012-0061956

(51) Int. Cl.
*H04N 5/222* (2006.01)
*H04N 5/232* (2006.01)
(Continued)

(52) U.S. Cl.
CPC ......... *H04N 5/23219* (2013.01); *H04N 5/4448* (2013.01); *H04N 5/772* (2013.01); *H04N 5/783* (2013.01); *G06F 3/033* (2013.01); *G11B 27/031* (2013.01); *G11B 27/34* (2013.01); *H04N 21/4222* (2013.01); *H04N 2005/44547* (2013.01); *H04N 2201/0096* (2013.01); *H04N 21/41407* (2013.01); *H04N 21/42209* (2013.01); *H04N 21/42224* (2013.01); *H04N 21/42226* (2013.01); *H04N 21/42228* (2013.01); *H04N 21/440263* (2013.01); *H04N 21/440281* (2013.01); *H04N 21/47217* (2013.01); *H04N 21/4722* (2013.01); *H04N 21/4725* (2013.01); *H04N 21/478* (2013.01); *H04N 21/4782* (2013.01); *H04N 21/4786* (2013.01); *H04N 21/4788* (2013.01); *H04N 21/4828* (2013.01); *H04N 21/485* (2013.01); *H04N 21/8133* (2013.01); *H04N 21/84* (2013.01)

(58) Field of Classification Search
CPC ..... G06F 3/005; G06F 3/048; H04N 1/00408; H04N 1/00411; H04N 5/23216
USPC .................. 348/333.01–333.05; 345/173–175
See application file for complete search history.

(56) References Cited

U.S. PATENT DOCUMENTS

2009/0073266 A1  3/2009 Abdellaziz Trimeche et al.
2010/0053342 A1* 3/2010 Hwang et al. ............ 348/207.99
(Continued)

*Primary Examiner* — Kelly L Jerabek
(74) *Attorney, Agent, or Firm* — Birch, Stewart, Kolasch & Birch, LLP

(57) ABSTRACT

A mobile terminal and controlling method thereof are disclosed, by which a capture image is created or various side functions are performed in accordance with a user's command input in a specific mode in the course of playing a video. The present invention includes playing a video on a touchscreen, entering a capture mode, detecting a touch input to a $1^{st}$ point of a $1^{st}$ region of the touchscreen with a pointer, displaying a capture user interface (UI) on a $2^{nd}$ region including the $1^{st}$ point while the touch input is maintained, removing the touch input from a $2^{nd}$ point of the capture user interface, and capturing an image at a timing point corresponding to the $2^{nd}$ point in the video.

14 Claims, 14 Drawing Sheets

(51) Int. Cl.

| | | |
|---|---|---|
| *H04N 5/44* | (2011.01) | |
| *H04N 5/77* | (2006.01) | |
| *G06F 3/033* | (2013.01) | |
| *G11B 27/031* | (2006.01) | |
| *G11B 27/34* | (2006.01) | |
| *H04N 21/422* | (2011.01) | |
| *H04N 21/414* | (2011.01) | |
| *H04N 21/4402* | (2011.01) | |
| *H04N 21/472* | (2011.01) | |
| *H04N 21/4722* | (2011.01) | |
| *H04N 21/478* | (2011.01) | |
| *H04N 21/482* | (2011.01) | |
| *H04N 21/81* | (2011.01) | |
| *H04N 21/84* | (2011.01) | |
| *H04N 5/783* | (2006.01) | |
| *H04N 5/445* | (2011.01) | |
| *H04N 21/4725* | (2011.01) | |
| *H04N 21/4782* | (2011.01) | |
| *H04N 21/4786* | (2011.01) | |
| *H04N 21/4788* | (2011.01) | |
| *H04N 21/485* | (2011.01) | |

(56) References Cited

U.S. PATENT DOCUMENTS

| | | | |
|---|---|---|---|
| 2010/0058182 A1* | 3/2010 | Jung | 715/702 |
| 2011/0004853 A1* | 1/2011 | Chang | 715/863 |
| 2011/0043651 A1* | 2/2011 | Nonaka et al. | 348/220.1 |
| 2011/0102464 A1* | 5/2011 | Godavari | 345/650 |
| 2011/0205171 A1* | 8/2011 | Akiyoshi | 345/173 |
| 2012/0140102 A1* | 6/2012 | Park et al. | 348/333.02 |
| 2013/0155308 A1* | 6/2013 | Wu et al. | 348/333.05 |
| 2013/0222671 A1* | 8/2013 | Tseng et al. | 348/333.11 |
| 2014/0071323 A1* | 3/2014 | Yi et al. | 348/333.01 |

* cited by examiner (a)

(b)

(c)

(d)

(a)

(b)

(a)

(b)

(c)

(a)

(b)

(a)

(b)

(c)

(a)

(b)

(c)

(a)

(b)

(c)

MOBILE TERMINAL FOR CAPTURING IMAGE AND CONTROLLING METHOD THEREOF

Pursuant to 35 U.S.C. §119(a), this application claims the benefit of earlier filing date and right of priority to Korean Patent Application No. 10-2012-0061956, filed on Jun. 11, 2012, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for creating a capture image or performing various side functions in accordance with a user's command input in a specific mode in the course of playing a video.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Specifically, in a situation that a mobile terminal is widely used in watching a video, the user's demand for a terminal capable of providing various kinds of convenient functions is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a played image is conveniently captured in a specific situation in the course of playing a video.

In particular, the object of the present invention is to provide a mobile terminal and controlling method thereof, by which a played image can be captured in a different way in accordance with a user's command input type.

Another object of the present invention is to provide a mobile terminal and controlling method thereof, by which various kinds of side function are provided in a specific situation in the course of playing a video.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a mobile terminal according to one embodiment of the present invention includes the steps of playing a video on a touchscreen, entering a capture mode, detecting a touch input to a $1^{st}$ point of a $1^{st}$ region of the touchscreen with a pointer, displaying a capture user interface (UI) on a $2^{nd}$ region including the $1^{st}$ point while the touch input is maintained, removing the touch input from a $2^{nd}$ point of the capture user interface, and capturing an image at a timing point corresponding to the $2^{nd}$ point in the video.

In another aspect of the present invention, a mobile terminal according to the present invention includes a touchscreen configured to recognize a touch input with a pointer and a controller, after a capture mode has been entered in the course of playing a video, if a touch input to a $1^{st}$ point of a $1^{st}$ region of the touchscreen with a pointer is detected, controlling a capture user interface (UI) to be displayed on a $2^{nd}$ region including the $1^{st}$ point while the touch input is maintained, the controller, if the touch input is removed from a $2^{nd}$ point of the capture user interface, controlling an image at a timing point corresponding to the 2nd point in the video to be captured.

Accordingly, the present invention provides the following effects and/or features.

First of all, a user can be more conveniently watch a video via a mobile terminal according to at least one embodiment of the present invention.

In particular, the present invention provides a capture method different in accordance with a type of a touch input in a specific situation in the course of playing a video, thereby increasing user's convenience.

Secondly, the present invention provides a mobile terminal and controlling method thereof, by which a played image is conveniently captured in a specific situation in the course of playing a video.

In particular, the present invention provides a mobile terminal and controlling method thereof, by which a played image can be captured in a different way in accordance with a user's command input type.

Thirdly, the present invention provides various video-associated side functions including a search function, a saving function and the like in a specific situation using caption control or metadata.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
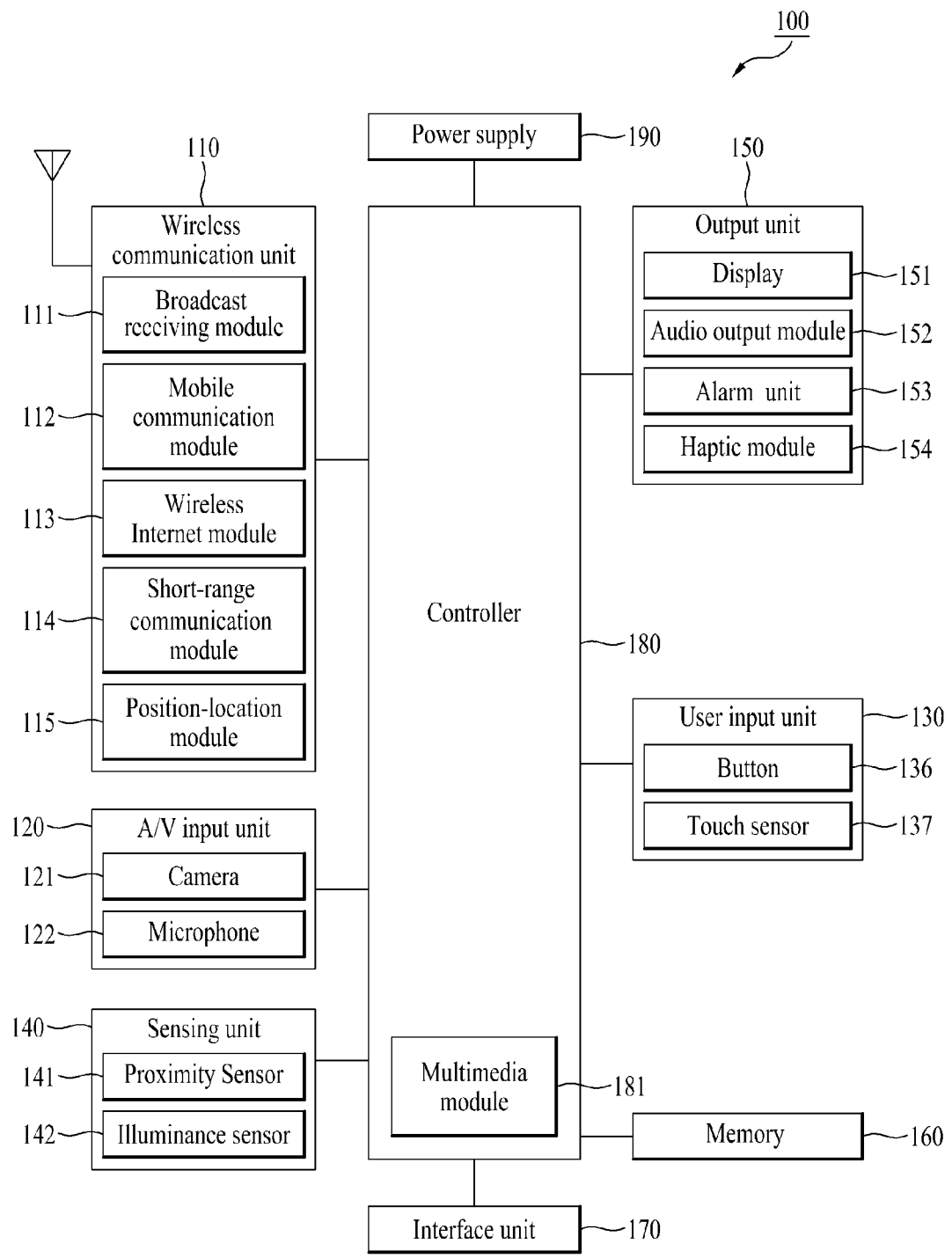
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless Internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
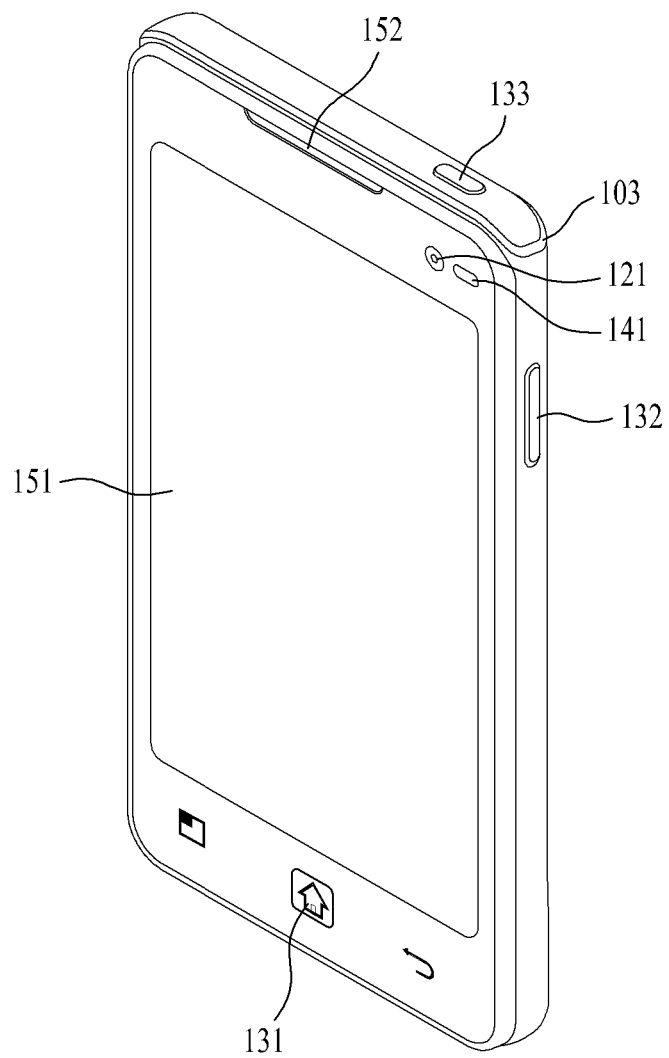
FIG. 2 is a front perspective diagram of a mobile or portable terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof. Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Interconnected operational mechanism between the display 151 and the touchpad 135 are explained with reference to FIG. 3 as follows.

Figure 3:
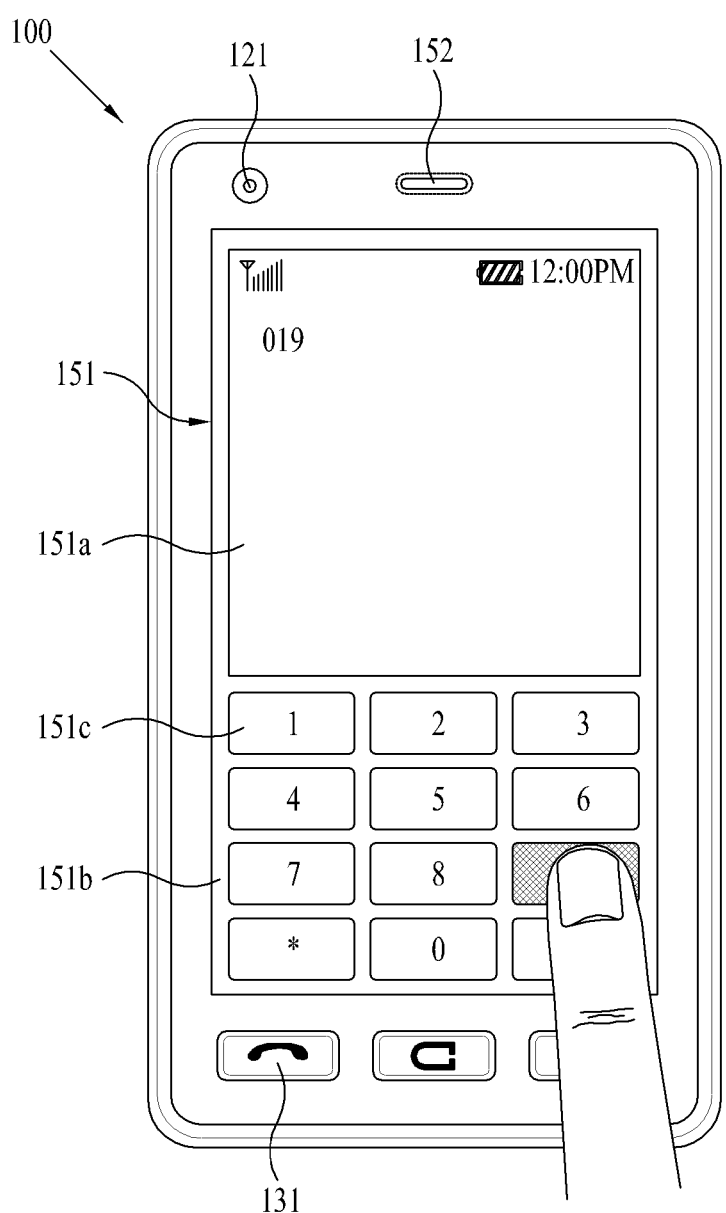
FIG. 3 is a front diagram of a mobile terminal according to one embodiment of the present invention to describe one operating status thereof.

FIG. 3 is a front-view of terminal 100 according to various embodiment of the present invention. First of all, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is inputted through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

For clarity and convenience of the following description, a mobile terminal mentioned in the following description is assumed as including at least one of the components shown in FIG. 1.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

In general, an application is conceptionally used as software separately installed and/or executed. Yet, an application mentioned in the description of the present invention conceptionally indicates all targets that visually display information on a prescribed region when a specific function is executed. The controller 180 of the mobile terminal according to the present invention is able to control at least two applications simultaneously. In doing so, the executed applications are displayed on partitioned screens of the display unit 151, respectively. Alternatively, one of the executed applications is displayed on a whole screen of the display unit 151. Alternatively, one of the executed applications is displayed in a manner of blocking at least one portion of a region related to the other executed application. Moreover, assume that the controller 180 of the mobile terminal 100 according to the present invention is able to perform a multitasking function of executing and controlling the above-mentioned at least two applications simultaneously.

Screen Capture in Specific Mode

According to one embodiment of the present invention, after a specific mode has been entered in the course of playing a video, a method for a user to perform a capture by inputting a touch & drag in a manner of searching for a play point of the video freely is provided. In this case, the play point search and capture method may vary in accordance with a type of a touch input. This is described with reference to FIG. 4 as follows.

Figure 4:
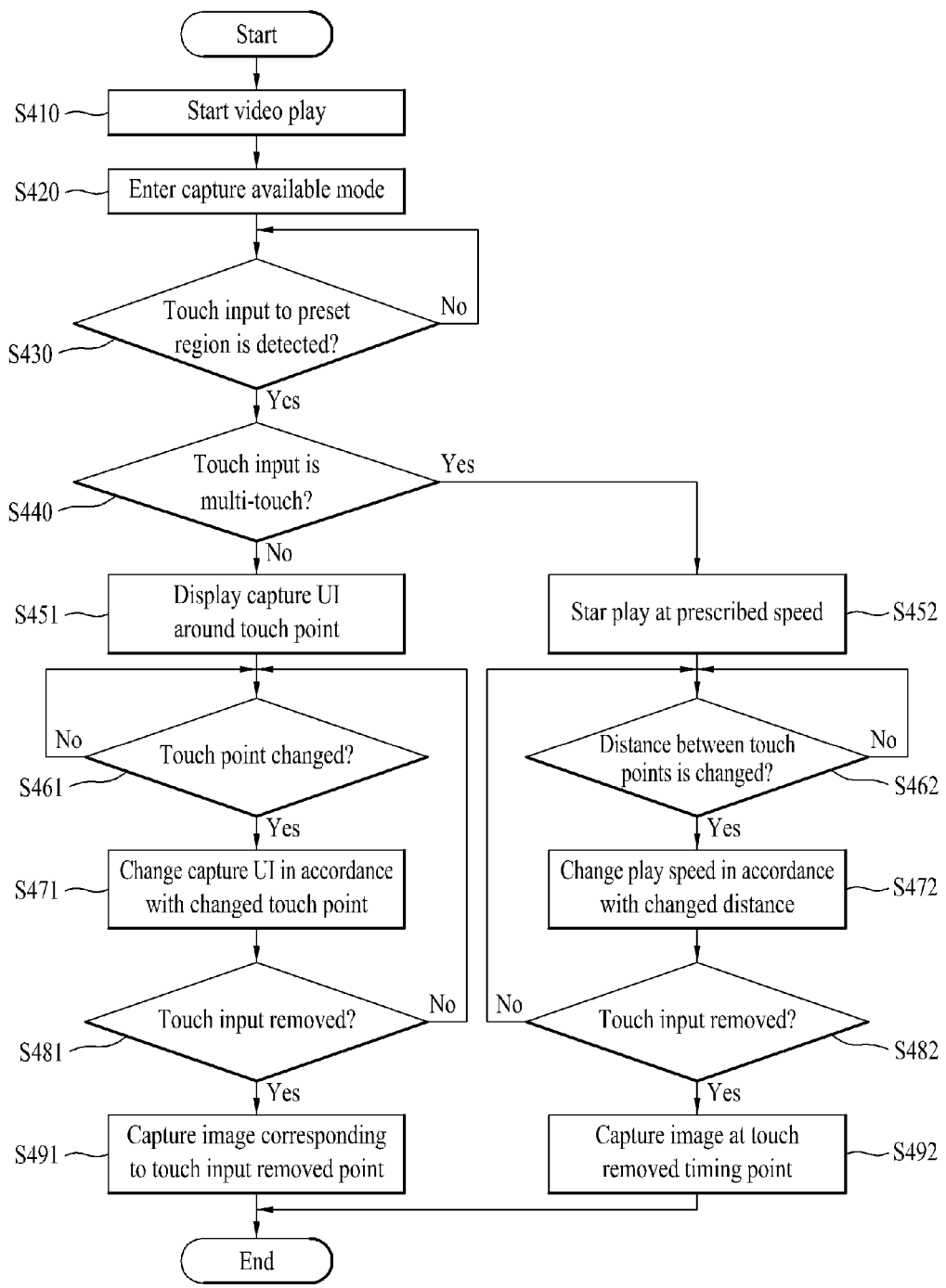
FIG. 4 is a flowchart for one example of a played image capture process in the course of a video play according to one embodiment of the present invention.

FIG. 4 is a flowchart for one example of a played image capture process in the course of a video play according to one embodiment of the present invention.

Referring to FIG. 4, a video play is initiated in a mobile terminal [S410]. In doing so, the video play may be variously performed in such a situation as a case that an application for the video play is activated in response to a user's command input, a case that a webpage containing a video is loaded via a web browser and the like. Moreover, a source of the video may be saved in the memory 160 of the mobile terminal in advance. Alternatively, a source of the video may be obtained by streaming and saved in the memory.

Thereafter, the mobile terminal may enter a video capture available mode (e.g., a capture mode) in response to a user's command input [S420]. In particular, the video capture available mode may include a pause mode in response to a selection of a pause menu or a play mode in response to a selection of a play mode. Alternatively, the video capture available mode may include a capture mode in response to a selection of a capture menu separately assigned for a capture function. Each of the menus may include a touch button displayed as overlaid on a played video or a key button provided to a housing of the mobile terminal.

In the video capture available mode, the controller 180 may determine whether a touch input is detected from a preset region [S430]. In this case, the preset region may include a whole touchscreen, a region previously set on a video play application, or a played image displayed region except a region (hereinafter named 'control panel' for clarity) of which menu buttons for controlling a video play mode. In doing so, the controller 190 may determine that the touch input is detected only if a contact of the corresponding touch input is maintained over a preset duration.

If the touch input is detected from the preset region in the video capture available mode, the controller 180 may determine a type of the detected touch input [S440]. In this case, the type of the touch input may be classified into a single touch of applying a touch input to a single point at the same time and a multi-touch of applying a touch input to at least two points at the same time.

If the type of the touch input is the single touch, while the touch input continues instead of being removed, the controller 180 may control a capture user interface (UI) to be displayed around a touch point on the touchscreen [S451]. In this case, the capture UI is the user interface that is provide to perform a capture according to the present embodiment and may include at least one of a progress bar and a thumbnail image per time slot.

While a contact between a pointer and the touchscreen is maintained, if a touch point is changed (i.e., if the pointer is dragged) [S461], the controller 180 may be able to change information of the capture UI to correspond to the changed touch point. A detailed configuration of the capture UI and an information change of the capture UI in response to a touch point change shall be described in detail with reference to FIG. 6 and FIG. 7 later.

Thereafter, if the touch input is removed from the capture UI [S481], the controller 180 may be able to capture an image of a time slot corresponding to the touch input removed point [S491]. In doing so, the captured image may be saved as an image file in the memory 160. And, the saved image file may be externally transmitted via another image linkage application (e.g., email, MMS, SNS, etc.).

On the other hand, if the multi-touch input is detected in the steps S430 to S440, while the multi-touch input is maintained, the video may be played at a predetermined speed [S452]. In doing so, the predetermined speed may be preferably lower than a normal play speed (i.e., lx). This is to enable a user to select a user-desired capture point accurately by playing back the video slow. Moreover, a play start timing point may correspond to a prescribed time (e.g., N seconds) ahead of a multi-touch input detected timing point. This is because a user generally activates a capture function after considering whether to capture a specific image in the course of watching a video.

After a play of the video has started, while the contact between the pointers and the touchscreen is maintained, if a distance between two touch points is changed (i.e., the pointers are dragged) [S462], a play speed may be changed in response to the changed distance [S472]. For instance, if the distance between the two touch points increases, the play speed may become higher than the predetermined speed. If the distance between the two touch points increases, the play speed may become lower than the predetermined speed. For another instance, if the distance between the two touch points increases, the play speed may become lower than the predetermined speed. If the distance between the two touch points increases, the play speed may become higher than the predetermined speed. Through this play speed change, a user may be able to conveniently adjust the search speed until a capture-desired point appears. In particular, in case that the capture-desired point has a big time difference from a current play timing point, a user may increase the play speed. If a current play timing point approaches the capture-desired point, a user may decreases the play speed to perform a capture at an accurate timing point.

Thereafter, if the multi-touch input is removed [S482], the controller 180 may be able to capture an image at the touch input removed timing point [S492]. In doing so, the captured image may be saved as an image file in the memory 160 in a manner similar to that of the single touch case. And, the saved image file may be externally transmitted via another image linkage application (e.g., email, MMS, SNS, etc.).

In the following description, a capture method using a single touch is explained in detail with reference to FIGS. 5 to 7.

Figure 5:
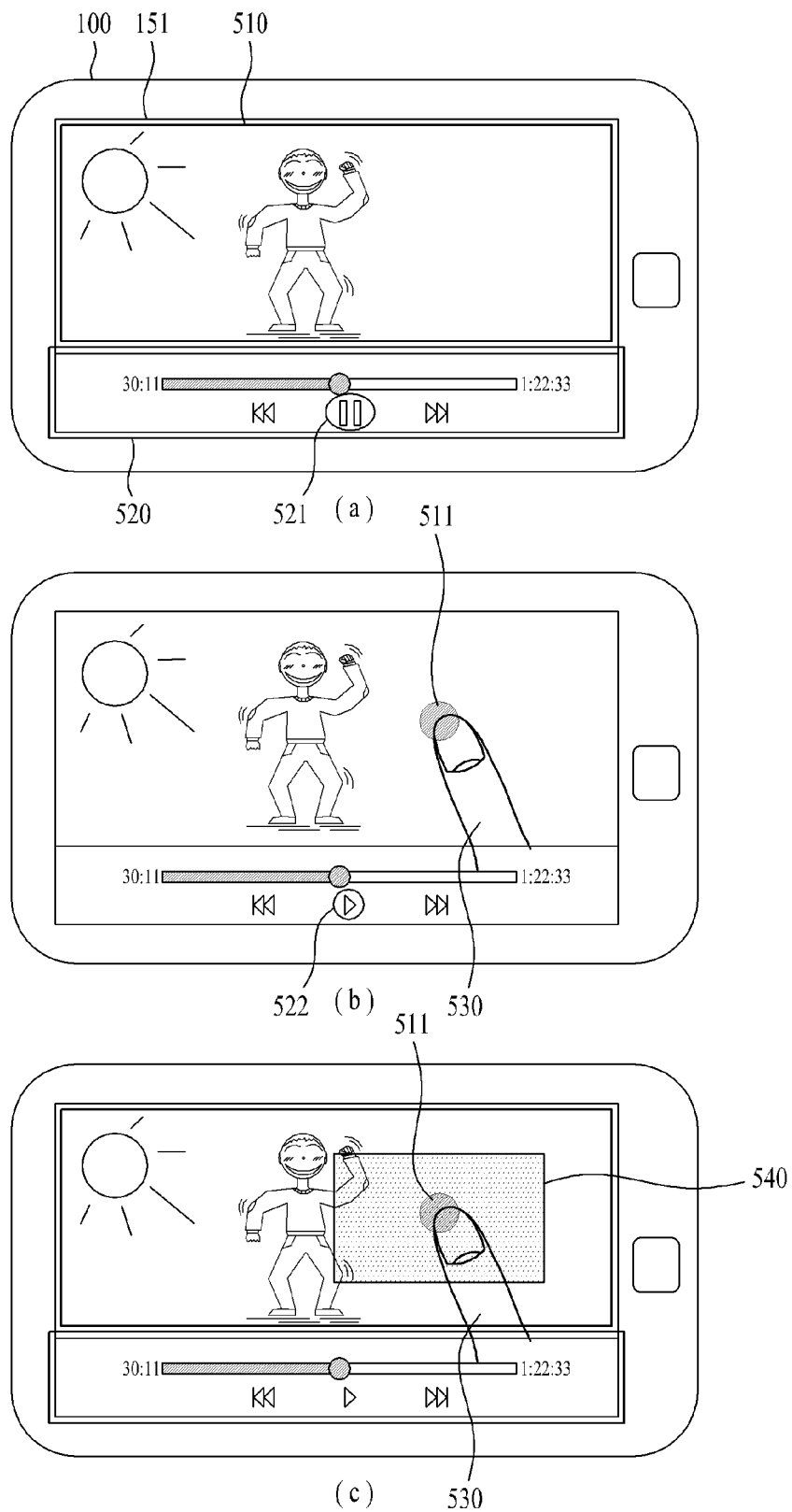
FIG. 5 is a diagram for one example of a capture UI paging process in response to a single touch in a mobile terminal according to one embodiment of the present invention.

FIG. 5 is a diagram for one example of a capture UI paging process in response to a single touch in a mobile terminal according to one embodiment of the present invention.

In the following drawings including FIG. 5, assume that a video is played via a prescribed application and that a capture available mode is a pause mode.

Referring to FIG. 5 (a), a video play application is activated via the touchscreen 151 of the mobile terminal 100. As the video play application is activated, a region 510 for displaying a played image of a video is displayed on an upper part of the touchscreen 151 and a control panel 520, on which a fast forward button, a rewind button, a pause button and the like are arranged to change a play state of the video, is displayed on a lower part of the touchscreen 151.

The arrangement positions of the image display region 510 and the control panel 520 are exemplarily shown, by which the present invention may be non-limited. For instance, the control panel 520 may disappear from the touchscreen 151 if any command is not inputted by a user for predetermined duration. If so, the image display region 510 may extend to a full screen. If the control panel 520 disappears, it may be displayed again by a touch to the touchscreen 151.

Alternatively, the image display region 510 may be always displayed as a full screen and the control panel may be displayed as an overlay on a prescribed region of the image display region 510. In doing so, the control panel may disappear or may be displayed again.

In the course of playback, if a user desires a capture of a specific image, the user may be able to select a pause menu 521. If the user selects the pause menu 521, the controller 180 may be able to recognize that the capture available mode is entered.

As the pause menu 521 is selected, referring to FIG. 5 (b), the play of the video is paused and the pause menu may be replaced by a play menu 522. In this state, the user is able to maintain a state of a single touch to a random point 511 of the image display region 510 with a pointer 530 in order to page a capture UI.

Accordingly, instantly or after elapse of predetermined duration, referring to FIG. 5 (c), the controller 180 may control the capture UI to be displayed within a prescribed range 540 around the touch point 511. A detailed configuration of the capture UI and an information change of the capture UI will be described in detail with reference to FIG. 6 as follows.

Figure 6:
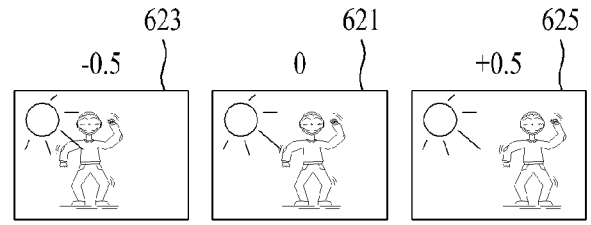
FIG. 6 is a diagram for one example of an information change of a capture UI in response to a touch point change in a mobile terminal according to one embodiment of the present invention.
Figure 6:
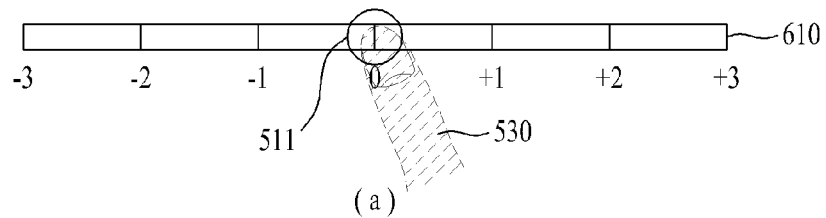
Figure 6:
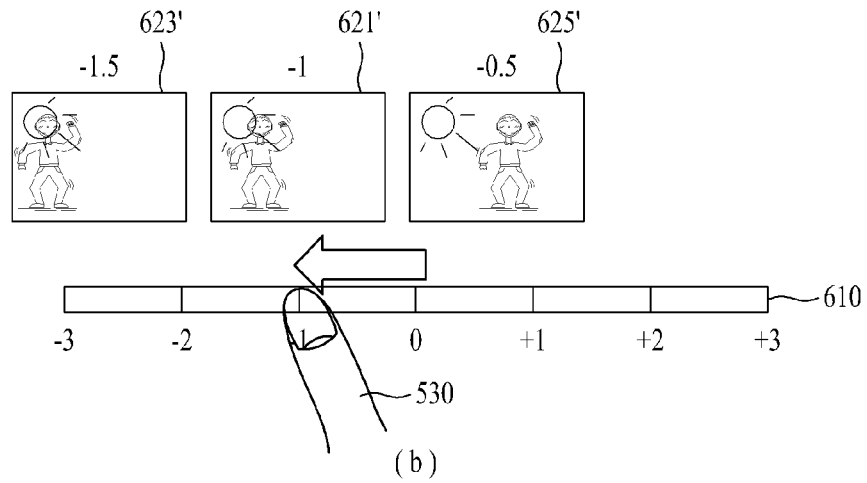
Figure 6:
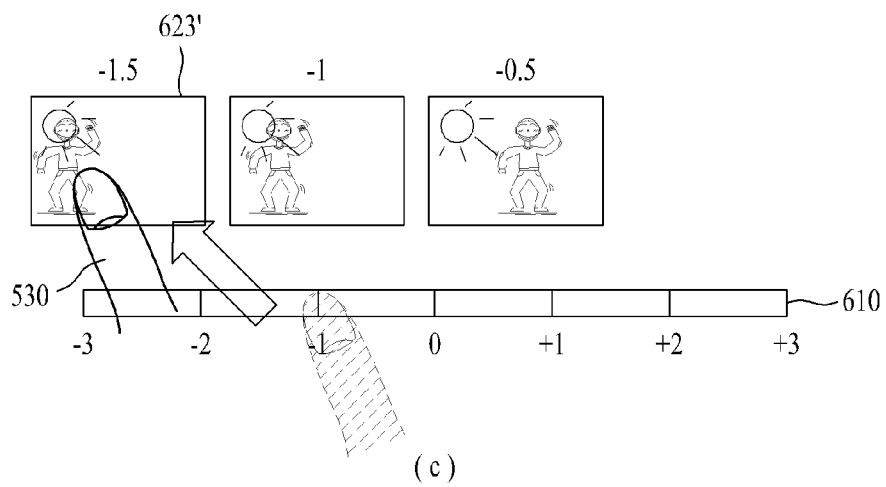

FIG. 6 is a diagram for one example of an information change of a capture UI in response to a touch point change in a mobile terminal according to one embodiment of the present invention.

FIG. 6 only shows a capture UI displayed within the prescribed range 540 around the single touch point described with reference to FIG. 5 (c). In the prescribed range 540 around the single touch point, a capture UI may be displayed as a non-transparent layer only. Alternatively, as a prescribed transparency is given to the prescribed range 540 around the single touch point, a video in a pause mode may be displayed behind a capture UI.

Referring to FIG. 6 (a), centering of a touch point 511 if a pointer 530, a progress bar 610 is displayed and a plurality of thumbnail images 621, 623 and 625 are displayed above the progress bar 610. In dong so, the progress bar 610 may be configured in a manner that numerals are given to each predetermined distance on a vertical line. In particular, a numeral 0 at a center corresponds to a pause timing point, a left side of the numeral 0 corresponds to a timing point previous to the pause timing point, and a right side of the numeral 0 corresponds to a timing point next to the pause timing point. In this case, a unit of time may include a second. The progress bar of the capture UI according to the present embodiment may be preferably configured to correspond to a time shorter than the progress bar displayed on the control panel in comparison with the same length. This is to enhance the accuracy of the search in a manner of allocating a relatively long bar to a short time period.

The thumbnail image 621 at the center represents an image of a timing point corresponding to a current touch point on the progress bar, the thumbnail image left to the center thumbnail image 621 represents an image at a timing point previous to the corresponding timing point by a predetermined time (e.g., 0.5 second), and the thumbnail image right to the center thumbnail image 621 represents an image at a timing point next to the corresponding timing point by the predetermined time. Hence, when the capture UI is initially displayed, a user may be able to check the image at the pause timing point, the image at the timing point spaced apart ahead of the pause timing point by a prescribed time interval, and the image at the timing point spaced apart behind the pause timing point by a prescribed time interval at once. In this state, if the user removes the touch input, the image at the pause mode entered timing point may be captured.

Referring to FIG. 6 (b), while the touch state is maintained, if the user drags the pointer 530 to a point corresponding to '−1 second' on the progress bar, a thumbnail image 621' at the corresponding timing point is displayed above the point corresponding to '−1 second' on the progress bar. Moreover, a thumbnail image 623' corresponding to an image at a timing point, (i.e., −1.5 second) to the left of the point corresponding to '−1 second' by −0.5 second and a thumbnail image 625' corresponding to an image at a timing point (i.e., −0.5 second) to the right of the point corresponding to '−1 second' by +0.5 second may be displayed above the progress bar. In particular, when the pointer is dragged on the progress bar, a position of a thumbnail above a touch point moves along the touch point and an image displayed within the thumbnail becomes an image at a timing point corresponding to the touch point. In this state, if the user removes the touch input, an image at a timing point ahead of the pause mode entered timing point by 1 second may be captured.

Unlike FIG. 6 (a) or FIG. 6 (b), a touch input may be removed from a thumbnail image instead of being removed from the progress bar. For instance, if a user attempts to capture an image corresponding to the thumbnail image 623' at −1.5 second in the state shown in FIG. 6 (b), the user drags the pointer 530 to the corresponding thumbnail image 623' and then removes the touch input [FIG. 6 (c)]. Therefore, the user may perform the capture in a manner of removing a touch from the progress bar or in a manner of removing a touch from a thumbnail image.

In case that a touch input is removed from any place except a progress bar or a thumbnail image, a capture UI disappears and a current state may return to the pause mode.

In FIG. 6, the touch & drag performed by 1 second unit on the progress bar, the progress bar setting set to a range of −3 second~+3 second, the number of thumbnails and the inter-thumbnail time interval are exemplarily proposed, by which the present invention may be non-limited. And, various configurations may apply to the present invention. This is described with reference to FIG. 7 as follows.

Figure 7:
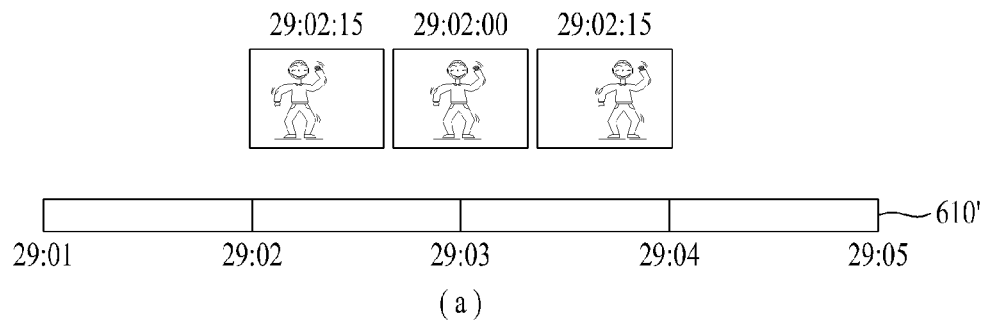
FIG. 7 is a diagram for one example of various configurations of a capture UI in a mobile terminal according to one embodiment of the present invention.
Figure 7:
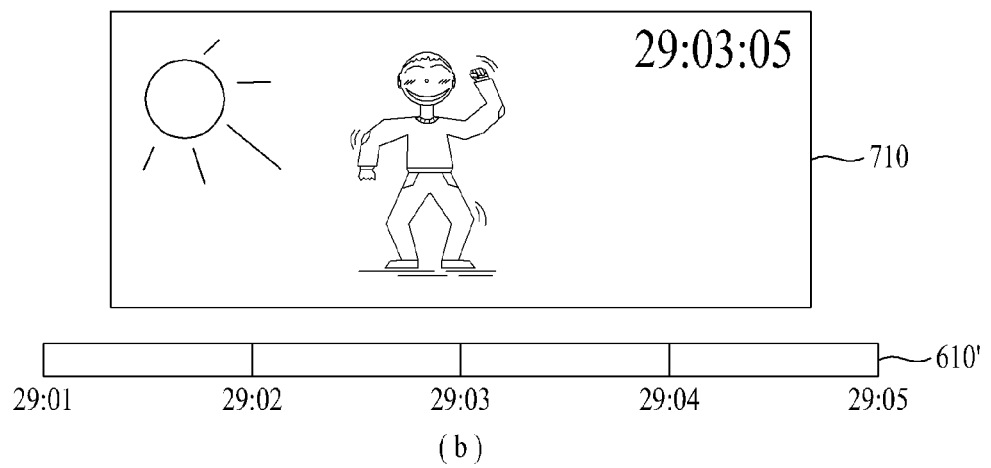
Figure 7:
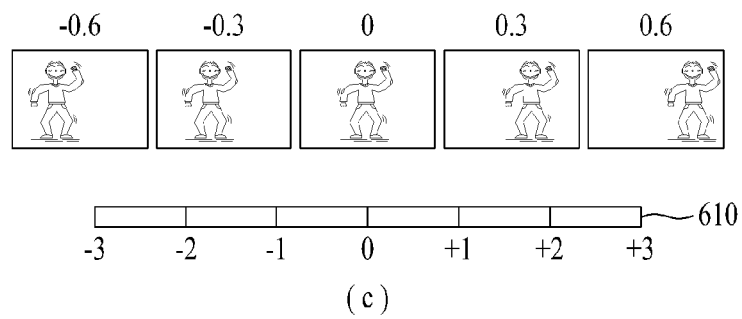
Figure 7:
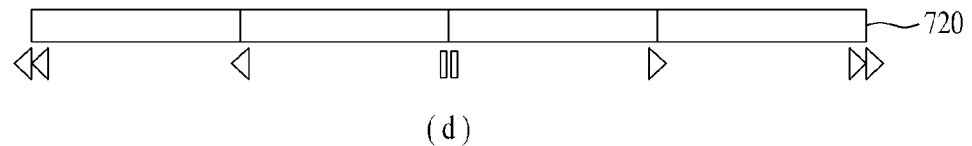

FIG. 7 is a diagram for one example of various configurations of a capture UI in a mobile terminal according to one embodiment of the present invention.

Referring to FIG. 7 (a), instead of displaying a time with reference to a pause timing point around a progress bar 610' [cf. FIG. 6], a real play timing point may be displayed. And, a real play timing point may be displayed around each thumbnail.

Referring to FIG. 7 (b), a large thumbnail image 710 may be displayed only instead of a plurality of small thumbnails. On the thumbnail image, a detailed timing point information on a timing point of applying a current single touch may be displayed.

Referring to FIG. 7 (c), more thumbnail images may be displayed. In this case, a time interval between the thumbnail images may be further narrowed (e.g., narrow down to 0.3 second from 0.5 second).

Referring to FIG. 7 (d), a search speed may be displayed on a progress bar 720 instead of a time unit. In this case, if a touch point is changed by dragging a pointer, the thumbnail image 710 of the type shown in FIG. 7 (b) may be updated at a speed corresponding to the changed touch point.

Each of the configurations of the capture UI exemplarily shown in FIG. 7 may be independently selected. Alternatively, components of each of the configurations may be selectively combined with the configuration shown FIG. 6 or FIG. 7.

In the following description, a procedure after completion of a capture by one of the aforementioned methods is explained with reference to FIG. 8.

Figure 8:
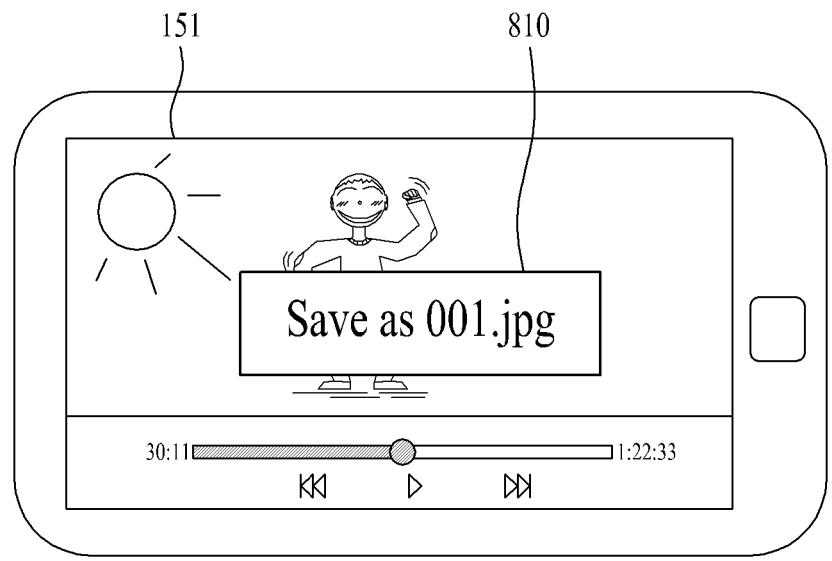
FIG. 8 is a diagram for one example of a process after completion of a capture in a mobile terminal according to one embodiment of the present invention.
Figure 8:
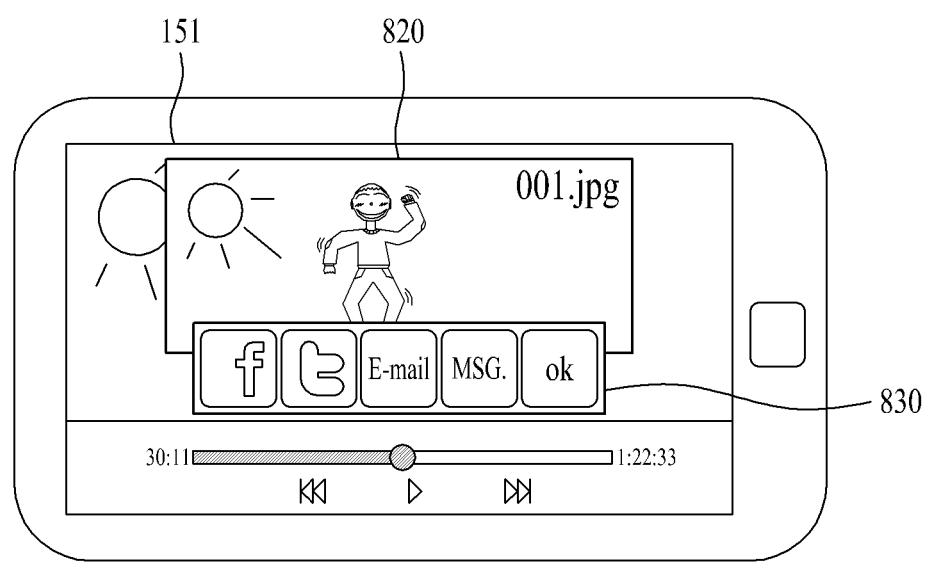

FIG. 8 is a diagram for one example of a process after completion of a capture in a mobile terminal according to one embodiment of the present invention.

Referring to FIG. 8 (a), if a capture is completed, a capture UI disappears and a popup window 810 indicating a file name of a capture image saved in the memory 160 may be temporarily displayed. In doing so, a storage path information may be included in the popup window as well as the file name.

Referring to FIG. 8 (b), if a capture is completed, an application list 830 linkable to a capture image may be displayed together with a thumbnail 820 of the capture image. For instance, if an SNS application is selected from the list 830, a new posting may be written at an account of a mobile terminal user by attaching a corresponding image. For another instance, if MMS is selected from the list 830, an MMS write mode may be activated and a corresponding capture image may be automatically set as an attachment file.

In the following description, a capture method via a multi-touch is explained with reference to FIG. 9.

Figure 9:
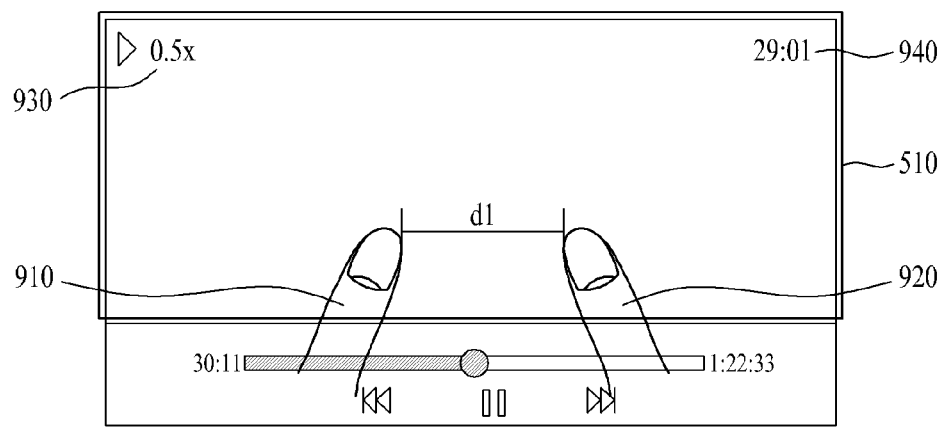
FIG. 9 is a diagram for one example of a play speed change in response to a multi-touch in a mobile terminal according to one embodiment of the present invention.
Figure 9:
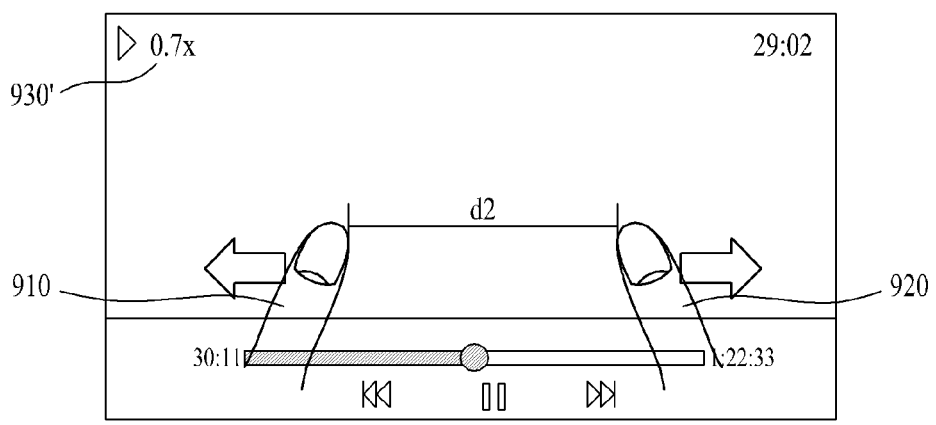
Figure 9:
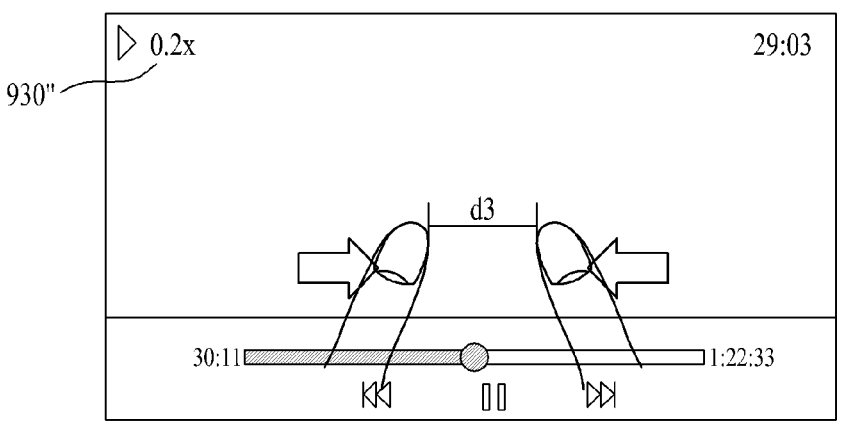

FIG. 9 is a diagram for one example of a play speed change in response to a multi-touch in a mobile terminal according to one embodiment of the present invention.

Referring to FIG. 9 (a), if a user simultaneously touches two different points in a prescribed region (herein, an image display region 510) with two pointers 910 and 920 in a capture mode (e.g., a pause mode), respectively and then maintains the contact state, a play may start at a preset speed. In doing so, both a current play speed 930 and a current play timing point 940 may be displayed on the image display region 510.

Referring to FIG. 9 (b), in case that the user attempts to raise a play speed for a faster search, a distance between the two touch points may be further increased (d1<d2).

On the contrary, in case that the user attempts to lower a play speed for an accurate search, the distance between the two touch points may be further decreased (d1>d3).

When a desired scene appears in the course of a slow search, if the user removes the multi-touch, the user may be able to capture an image at the touch removed timing point. A procedure after completion of the capture is similar to the former description with reference to FIG. 8 and it s details shall be omitted for clarity of the following description.

Side Functions

In the following description, various kinds of side functions of a video play application according to another embodiment are explained. The side functions in the following may be applicable together in a range of avoiding collision with the aforementioned capture method according one embodiment of the present invention.

Figure 10:
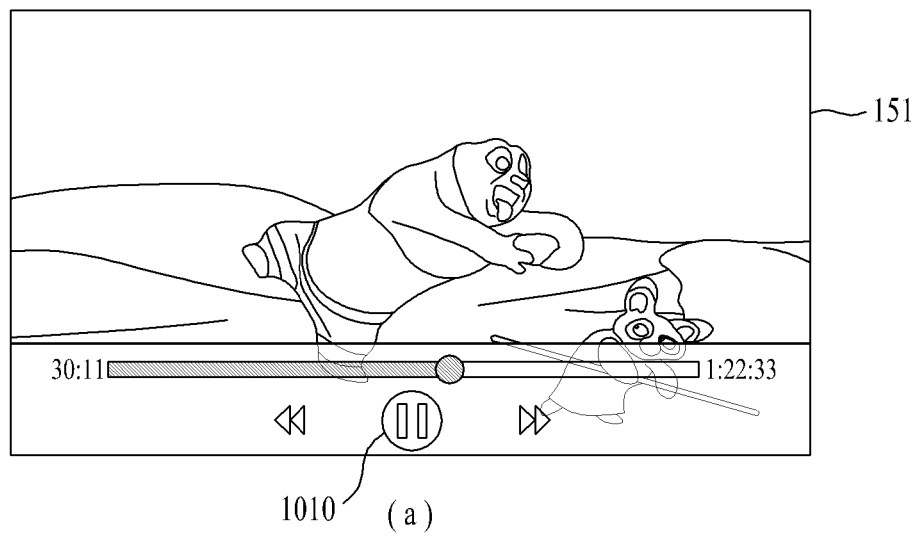
FIG. 10 is a diagram for one example of a configuration setting method for being paged in a pause mode of a mobile terminal according to another embodiment of the present invention.
Figure 10:
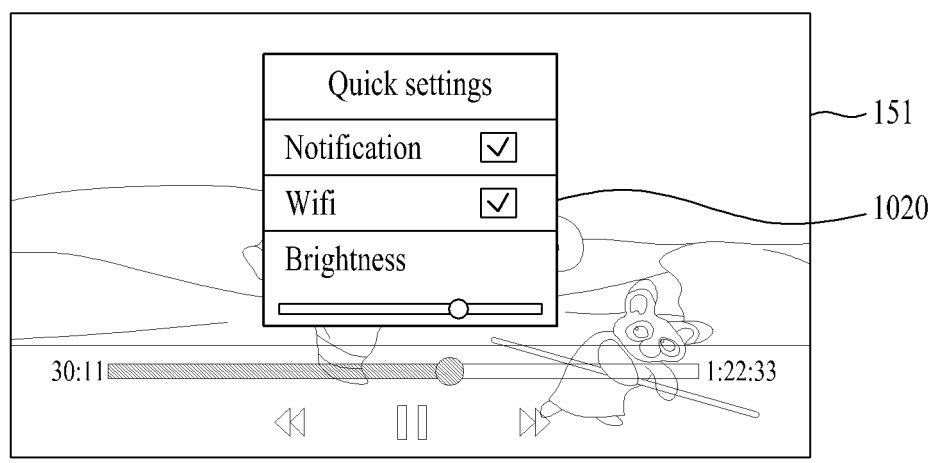

FIG. 10 is a diagram for one example of a configuration setting method for being paged in a pause mode of a mobile terminal according to another embodiment of the present invention.

Referring to FIG. 10, while a video is played on the touchscreen 151, if a pause menu 1010 is selected [FIG. 10 (a)], the controller 180 may display a popup window 1020 containing configuration setting menus [FIG. 10 (b)]. In particular, the configuration setting menus may include a notification menu for selecting whether to notify an occurrence of an external event (e.g., a text reception, a cal signal reception, etc.) in the course of playing a video, a menu for selecting a type of a network to be used for streaming, a menu for adjusting a screen brightness and the like.

Figure 11:
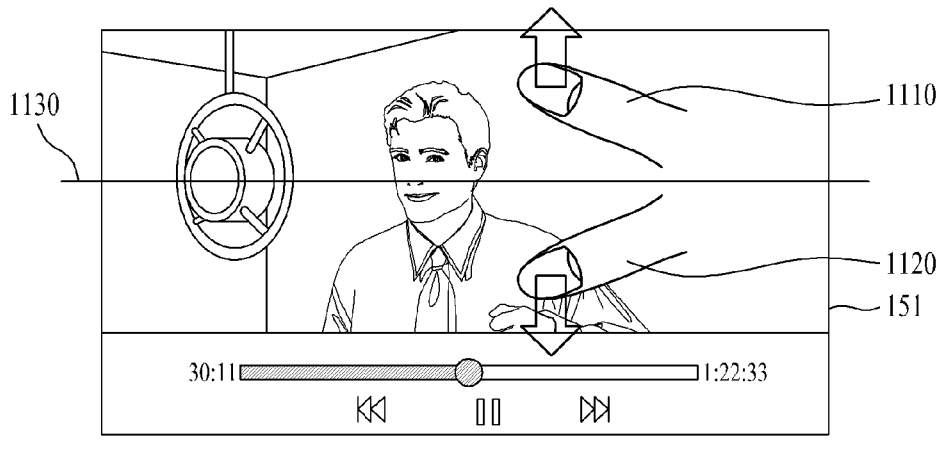
FIG. 11 is a diagram for one example of a side function executable in the course of a video play in a mobile terminal according to another embodiment of the present invention.
Figure 11:
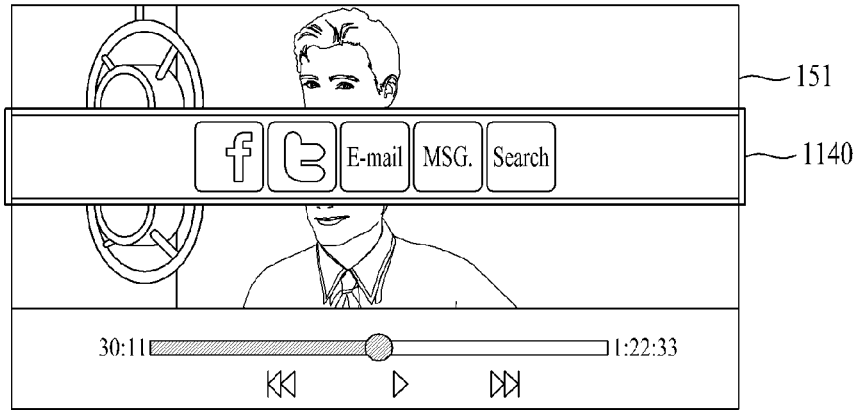
Figure 11:
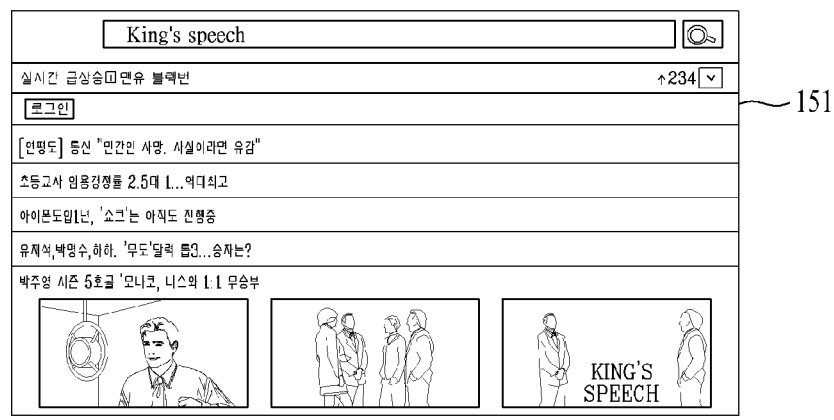

FIG. 11 is a diagram for one example of a side function executable in the course of a video play in a mobile terminal according to another embodiment of the present invention.

Referring to FIG. 11 (a), while a video is played on the touchscreen 151, a user multi-touches top and bottom regions, which are discriminated from each other along a horizontal partitioning line 1130 of an image display region, with two pointers 1110 and 1120, respectively, and may be then drag the pointers in a manner of increasing a distance between the touch points. If so, referring to FIG. 11 (b), the video is paused, the image display region is divided into two parts. The two parts then move in drag directions of the pointers to get distant from each other with reference to the horizontal partitioning line 1130, respectively. In dong so, a linkable application list 1140 can be displayed in the middle of the touchscreen.

If a specific application is selected from the application list 1140, a side function may be activated using a screen shot or meta information of the currently played video. For instance, if a search application is selected from the application list 1140, referring to FIG. 11 (c), the search application can be activated while a title of the corresponding video is inputted to a search window. In formation on the title may be extracted from one of a file name, header information and meta information of a video source file and the like. In case of SNS application, it may be able to automatically compose a posting to the effect that the corresponding video is being watched. In doing so, a capture image of a current timing point may be attached together.

Figure 12:
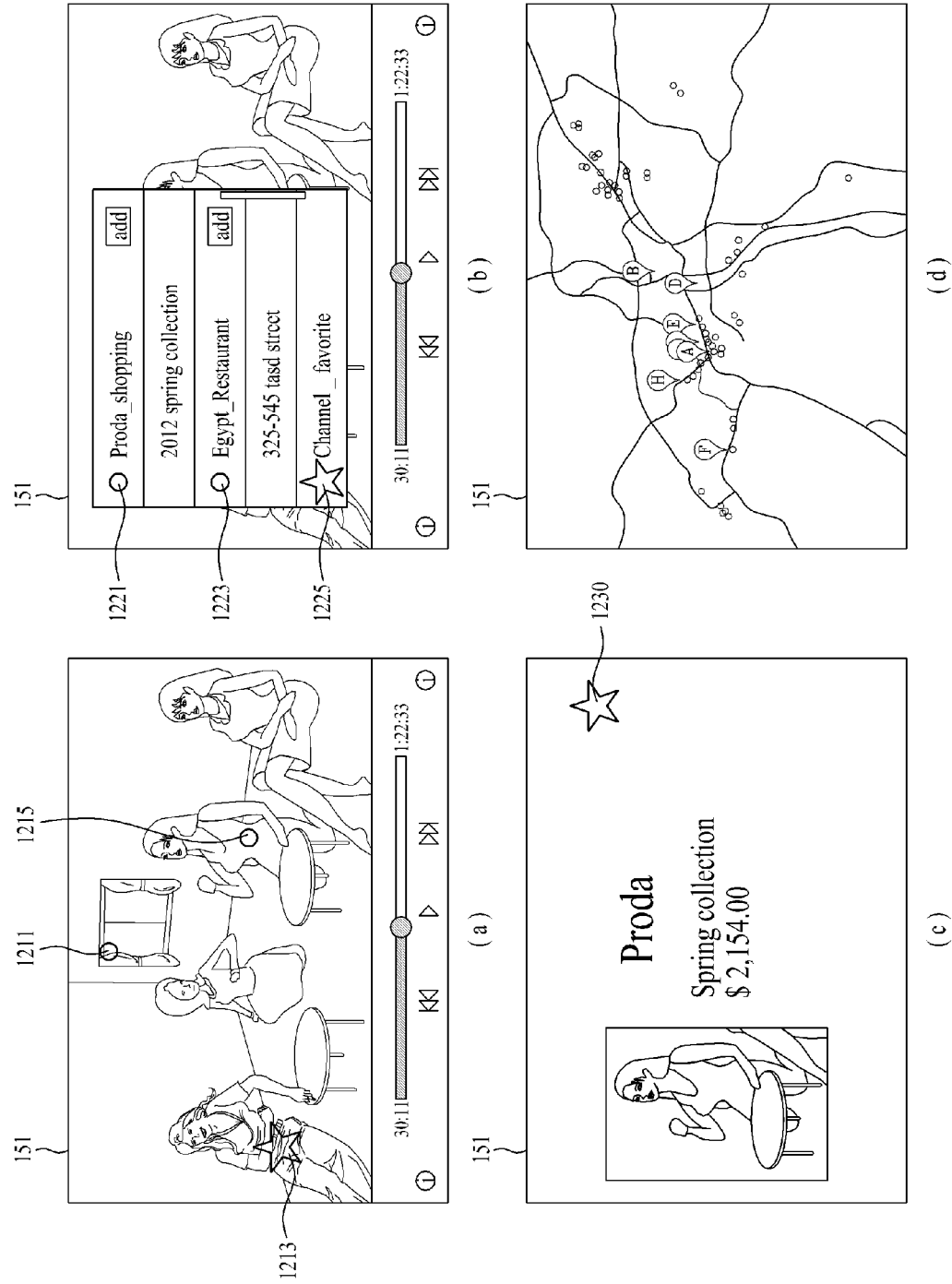
FIG. 12 is a diagram for one example of a tag function executable in a paused mode of a mobile terminal according to another embodiment of the present invention.

FIG. 12 is a diagram for one example of a tag function executable in a paused mode of a mobile terminal according to another embodiment of the present invention.

Figure 13:
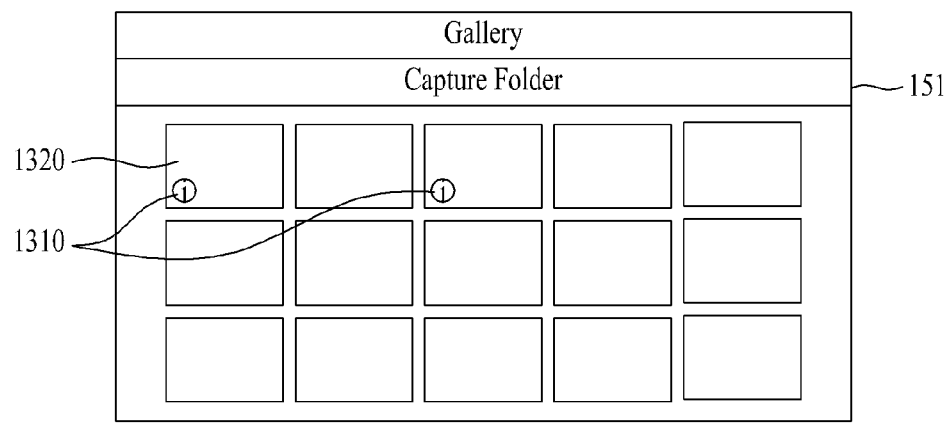
FIG. 13 is a diagram for one example of giving tag information to a capture image in a mobile terminal according to another embodiment of the present invention.
Figure 13:
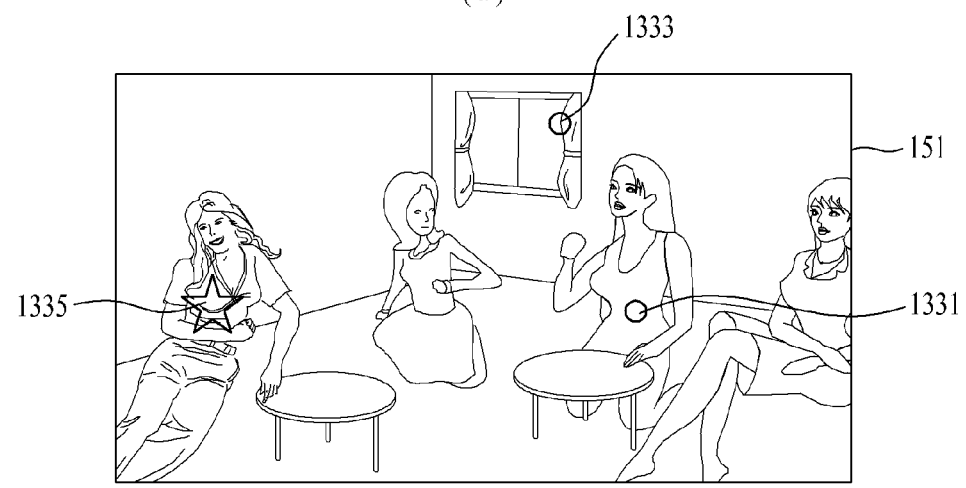
Figure 13:
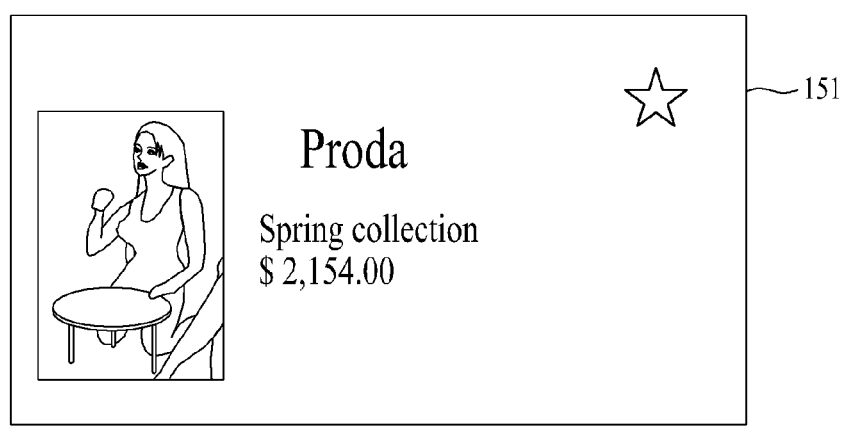

In FIG. 12 and FIG. 13, assume a case that a tag information or a meta information is previously contained in a video per time or an image per coordinates. And, the tag information or the meta information may contain an image, a hyperlink information and the like in addition as well as text information.

Referring to FIG. 12 (a), if a pause mode is entered in the course of playing a video on the touchscreen 151, indicators 1211, 1213 and 1215 may be displayed on a still image. In this case, each of the indicators may indicate that metadata is contained at a corresponding position. A shape or color may be given to each of the indicators in a manner of differing per category. For instance, the indicator corresponding to the metadata belong to a category set to a bookmark may be set as a star shape 1213.

If one of the indicators is selected, referring to FIG. 12 (b), a popup window 1220 including a list and description of metadata corresponding to each of the indicators may be displayed. If a metadata item 1221 related to clothing information is selected from the popup window 1220, referring to FIG. 12 (c), a detailed information may be displayed. If the star-shaped icon 1230 is selected, a bookmark attribute may be given to the corresponding meta information. If a metadata item 1223 related to place information is selected from the popup window, referring to FIG. 12 (d), a map information may be displayed. Of course, if each indicator is selected in such a situation as shown in FIG. 12 (a), the process shown in FIG. 12 (b) is omitted and the information shown in FIG. 12 (c) or FIG. 12 (d) may be displayed.

Meanwhile, in the situation shown in FIG. 12 (a), if the corresponding still image is captured, meta information may be recorded together with a capture image file. This is described with reference to FIG. 13 as follows.

FIG. 13 is a diagram for one example of giving tag information to a capture image in a mobile terminal according to another embodiment of the present invention.

Referring to FIG. 13, after a capture image has been created by one of the aforementioned methods according to one embodiment of the present invention in such a situation as shown in FIG. 12 (a), if a gallery application is activated, thumbnails of images saved in the memory 160 can be displayed [FIG. 13 (a)]. In doing so, an indicator 1310 of a prescribed shape may be given to the thumbnail of the image containing metadata. If a prescribe thumbnail image 1320 is selected from the thumbnail images having the indicator 1310 given thereto, an original image corresponding to the selected thumbnail may be displayed as a full screen [FIG. 13 (b)]. In doing so, indicators 1331, 1333 and 1335 respectively corresponding to the meta informations saved together in the corresponding image may be displayed. Of one of the indicators is selected, a detailed information on the meta information corresponding to the corresponding indicator may be displayed. For instance, if the indicator 1331 situated on a dress is selected, a detailed information on the dress can be displayed [FIG. 13 (c)].

Figure 14:
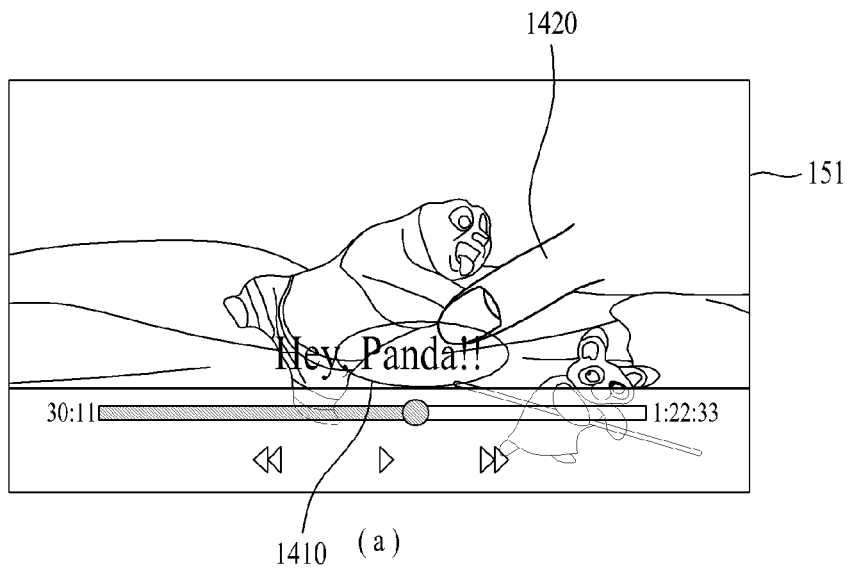
FIG. 14 is a diagram for one example of a side function executable in association with a caption in a mobile terminal according to another embodiment of the present invention.
Figure 14:
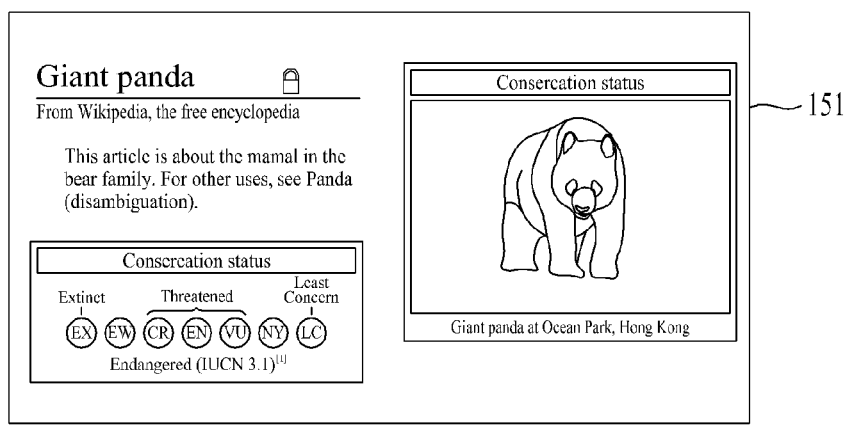
Figure 14:
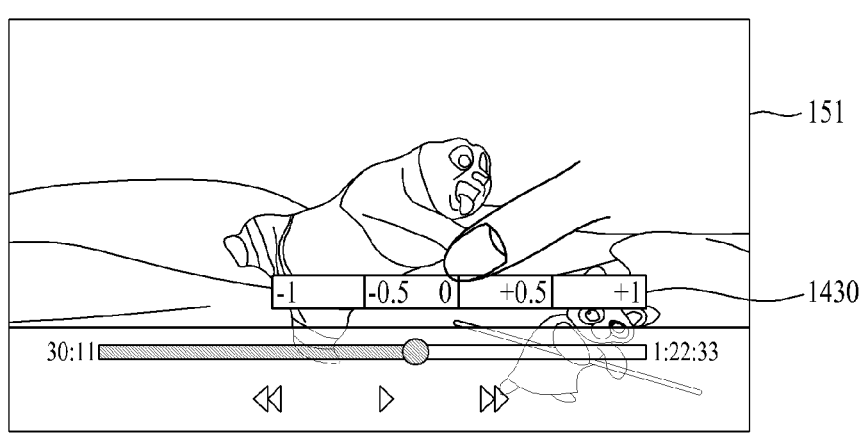

FIG. 14 is a diagram for one example of a side function executable in association with a caption in a mobile terminal according to another embodiment of the present invention.

Referring to FIG. 14 (a), in the course of playing a video containing a caption on the touchscreen 151, a play of the video may be paused in response to a user's command input. In doing so, if the user inputs a touch to a specific part 1410 of the caption with a pointer 1420, the controller 180 extracts a text of the corresponding part, obtains a search result from a predetermined search means (e.g., portal website, etc.) using the extracted text, and then displays the corresponding result on the touchscreen 151 [FIG. 14 (b)].

If a long touch input is applied to the caption in the state shown in FIG. 14 (a), while the long touch input is maintained, a progress bar 1430 may be displayed [FIG. 14 (c)]. A time unit may be displayed on the progress bar 1430 in a predetermined interval. After the pointer has been dragged on the progress bar 1430, if the touch input is removed, a sync of the caption may be changed by a time corresponding to the touch input removed point. Of course, if a single touch input or a multi-touch input is applied to an image display region except the caption, the aforementioned capture function may be performed.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

What is claimed is:

1. A method of controlling a mobile terminal, the method comprising:
   playing a video on a touchscreen;
   entering a capture mode;
   detecting a touch input to a 1st point of a 1st region of the touchscreen with a pointer;
   displaying a capture user interface (UI) on a 2nd region including the 1st point while the touch input is maintained;
   removing the touch input from a 2nd point of the capture user interface; and
   capturing an image at a timing point corresponding to the 2nd point in the video,
   wherein the capture UI comprises at least one of a progress bar corresponding to a prescribed time interval of the video and a thumbnail image corresponding to each of at least one timing point included in the time interval, and
   wherein the capture mode includes a pause state, and a center of the progress bar is situated at the 1st point and corresponds to a timing point of entering the pause state.

2. The method of claim 1, wherein the 2nd point comprises one point on the progress bar or a point corresponding to one of the at least one thumbnail image.

3. The method of claim 1, wherein if the 1st point is identical to the 2nd point, the capturing step comprises capturing the image corresponding to the timing point of entering the pause state.

4. The method of claim 1, wherein the at least one thumbnail image comprises a 1st thumbnail image and corresponds to the image at the timing point corresponding to a touch point of the pointer on the progress bar.

5. The method of claim 4, wherein the 1st thumbnail image is displayed in the vicinity of a position corresponding to the touch point of the pointer on the progress bar.

6. The method of claim 4, wherein the at least one thumbnail image further comprises a 2nd thumbnail image and a 3rd thumbnail image, and
wherein the 2nd thumbnail image and the 3rd thumbnail image are displayed in the vicinity of the 1st thumbnail image.

7. The method of claim 6, wherein the 2nd thumbnail image corresponds to a timing point ahead of a timing point corresponding to the 1st thumbnail image by a prescribed time, and
wherein the 3rd thumbnail image corresponds to a timing point behind the timing point corresponding to the 1st thumbnail image by the prescribed time.

8. The method of claim 1, further comprising saving the captured image at the timing point corresponding to the 2nd point in a memory.

9. The method of claim 8, further comprising:
displaying a list of at least one image linkage application;
selecting a prescribed application from the list; and
transmitting the captured image at the timing point corresponding to the 2nd point externally via the selected application.

10. A mobile terminal, comprising:
a touchscreen configured to recognize a touch input with a pointer; and
a controller configured to:
after a capture mode has been entered in the course of playing a video, and if a touch input to a 1st point of a 1st region of the touchscreen with a pointer is detected, displaying a capture user interface (UI) on a 2nd region including the 1st point while the touch input is maintained, and
if the touch input is removed from a 2nd point of the capture user interface, capturing an image at a timing point corresponding to the 2nd point in the video,
wherein the capture UI comprises at least one of a progress bar corresponding to a prescribed time interval of the video and a thumbnail image corresponding to each of at least one timing point included in the time interval, and
wherein the capture mode includes a pause state, and a center of the progress bar is situated at the 1st point and corresponds to a timing point of entering the pause state.

11. The mobile terminal of claim 10, wherein the 2nd point comprises one point on the progress bar or a point corresponding to one of the at least one thumbnail image.

12. The mobile terminal of claim 10, wherein if the 1st point is identical to the 2nd point, the controller is further configured to capture the image corresponding to the timing point of entering the pause state.

13. The method of claim 10, wherein the at least one thumbnail image comprises a 1st thumbnail image and corresponds to the image at the timing point corresponding to a touch point of the pointer on the progress bar.

14. The method of claim 13, wherein the 1st thumbnail image is displayed in the vicinity of a position corresponding to the touch point of the pointer on the progress bar.

* * * * *